(12) United States Patent
Johnson et al.

(10) Patent No.: US 8,764,986 B2
(45) Date of Patent: Jul. 1, 2014

(54) SUBMERGED SYSTEM AND METHOD FOR REMOVAL OF UNDESIRABLE SUBSTANCES FROM AQUEOUS MEDIA

(75) Inventors: Kraig Johnson, South Jordan, UT (US); Lawrence D. Reaveley, Salt Lake City, UT (US); Fred Jaeger, Henrieville, UT (US); Hua Xu, Salt Lake City, UT (US); Robert Okey, Murrieta, CA (US); Joyce A. Okey, legal representative, Murrieta, CA (US)

(73) Assignee: University of Utah Research Foundation, Salt Lake City, UT (US)

( * ) Notice: Subject to any disclaimer, the term of this patent is extended or adjusted under 35 U.S.C. 154(b) by 450 days.

(21) Appl. No.: 13/141,677

(22) PCT Filed: Dec. 22, 2009

(86) PCT No.: PCT/US2009/069283
§ 371 (c)(1),
(2), (4) Date: Sep. 16, 2011

(87) PCT Pub. No.: WO2010/075439
PCT Pub. Date: Jul. 1, 2010

(65) Prior Publication Data
US 2012/0152832 A1 Jun. 21, 2012

Related U.S. Application Data

(60) Provisional application No. 61/140,041, filed on Dec. 22, 2008, provisional application No. 61/140,039, filed on Dec. 22, 2008.

(51) Int. Cl.
*C02F 3/06* (2006.01)
*C02F 3/10* (2006.01)
*C02F 3/30* (2006.01)
*C02F 101/16* (2006.01)
*C02F 103/20* (2006.01)

(52) U.S. Cl.
CPC ............. *C02F 3/101* (2013.01); *C02F 3/301* (2013.01); *C02F 3/302* (2013.01); *C02F 3/308* (2013.01); *C02F 3/06* (2013.01); *C02F 2101/16* (2013.01); *C02F 2103/20* (2013.01); *C02F 2203/006* (2013.01); *Y10S 210/903* (2013.01); *Y10S 210/906* (2013.01); *Y10S 210/926* (2013.01)
USPC ........... 210/605; 210/615; 210/617; 210/629; 210/630; 210/150; 210/175; 210/194; 210/903; 210/906; 210/926

(58) Field of Classification Search
USPC ......... 210/605, 612, 615, 629, 630, 150, 151, 210/175, 185, 194, 903, 906, 926, 616, 617
See application file for complete search history.

(56) References Cited

U.S. PATENT DOCUMENTS

| | | |
|---|---|---|
| 2,196,630 A | 4/1940 | Hartmann |
| 3,739,912 A | 6/1973 | Miller, Jr. |
| 3,768,788 A | 10/1973 | Candel |
| 3,788,478 A | 1/1974 | Savage |
| 3,904,525 A | 9/1975 | Rosenberg |
| 4,051,035 A | 9/1977 | Boschen et al. |
| 4,137,171 A * | 1/1979 | Yokata ................... 210/150 |
| 4,190,543 A | 2/1980 | Pederson et al. |
| 4,279,753 A | 7/1981 | Nielson et al. |
| 4,288,394 A | 9/1981 | Ewing et al. |
| 4,370,234 A | 1/1983 | Marsland |
| 4,415,454 A | 11/1983 | Fuchs |
| 4,479,876 A | 10/1984 | Fuchs |
| 4,632,758 A | 12/1986 | Whittle |
| 4,668,442 A | 5/1987 | Lang |
| 4,818,391 A * | 4/1989 | Love ....................... 210/926 |
| 4,818,404 A | 4/1989 | McDowell |
| 4,842,732 A | 6/1989 | Tharp |
| 4,911,836 A | 3/1990 | Haggerty |
| 4,948,510 A * | 8/1990 | Todd et al. .............. 210/605 |
| 4,975,197 A * | 12/1990 | Wittmann et al. ....... 210/629 |
| 5,062,958 A * | 11/1991 | Bateson et al. .......... 210/615 |
| 5,076,929 A * | 12/1991 | Fuchs et al. ............. 210/615 |
| 5,122,266 A | 6/1992 | Kent |
| 5,160,620 A | 11/1992 | Lygren |
| 5,185,080 A | 2/1993 | Boyle |
| 5,211,847 A | 5/1993 | Kanow |

| | | | |
|---|---|---|---|
| 5,228,998 A | | 7/1993 | DiClemente et al. |
| 5,275,722 A | * | 1/1994 | Beard ............................ 210/903 |
| 5,316,671 A | | 5/1994 | Murphy |
| 5,326,459 A | | 7/1994 | Hlavach et al. |
| 5,389,247 A | | 2/1995 | Woodside |
| 5,458,817 A | | 10/1995 | Lang |
| 5,486,291 A | * | 1/1996 | Todd et al. .................... 210/629 |
| 5,498,376 A | | 3/1996 | St. Louis et al. |
| 5,500,119 A | | 3/1996 | Jenelle |
| 5,507,950 A | | 4/1996 | Senda et al. |
| 5,514,278 A | | 5/1996 | Khudenko |
| 5,518,620 A | | 5/1996 | Eguchi et al. |
| 5,531,894 A | | 7/1996 | Ball et al. |
| 5,545,327 A | | 8/1996 | Volland |
| 5,556,536 A | | 9/1996 | Turk |
| 5,626,755 A | | 5/1997 | Keyser et al. |
| 5,651,892 A | | 7/1997 | Pollock |
| 5,681,471 A | | 10/1997 | Silverstein |
| 5,702,604 A | | 12/1997 | Yamasaki et al. |
| 5,846,425 A | | 12/1998 | Whiteman |
| 5,861,095 A | | 1/1999 | Vogel et al. |
| 5,863,435 A | | 1/1999 | Heijnen et al. |
| 5,948,262 A | * | 9/1999 | Todd et al. .................... 210/150 |
| 5,954,451 A | | 9/1999 | Presby |
| 5,972,212 A | | 10/1999 | Hongo |
| 5,981,272 A | * | 11/1999 | Chang ............................ 210/150 |
| 6,007,720 A | | 12/1999 | Tomita |
| 6,071,593 A | | 6/2000 | Lang et al. |
| 6,103,123 A | | 8/2000 | Gantzer |
| 6,136,194 A | | 10/2000 | Vogel et al. |
| 6,406,630 B1 | * | 6/2002 | Henry ............................ 210/150 |
| 6,514,410 B1 | | 2/2003 | Gantzer |
| 6,558,548 B2 | | 5/2003 | Svirklys et al. |
| 6,592,762 B2 | * | 7/2003 | Smith ............................ 210/605 |
| 6,773,595 B2 | | 8/2004 | Gantzer |
| 6,821,426 B1 | | 11/2004 | Hausin et al. |
| 7,008,539 B2 | | 3/2006 | Johnson et al. |
| 7,465,394 B2 | * | 12/2008 | Durda et al. .................... 210/615 |
| 7,862,711 B2 | * | 1/2011 | Han ................................ 210/151 |
| 2004/0222150 A1 | * | 11/2004 | Hong et al. .................... 210/605 |

FOREIGN PATENT DOCUMENTS

| | | |
|---|---|---|
| DE | 3843789 | 7/1989 |
| DE | 4001482 | 4/1991 |
| GB | 2136791 | 3/1983 |
| GB | 2270909 | 3/1994 |
| JP | 2003/225690 | 8/2003 |
| JP | 2004/330156 | 11/2004 |
| WO | WO 2004/103511 | 12/2004 |

OTHER PUBLICATIONS

The World's Best Tower Packing and Heat Recovery Media; http://www.lantecp.com/lanpacx1/ ; 1 page; Aug. 27, 2008.

Lantec, Products Incorporated; Case Study #32, Application: Bioremediation, Industry: Food Processing; http://www.tvt-bio.com/pdf/cheesehistory.pdf; 2 pages as accessed Aug. 27, 2008.

Winery Application, High Strength Waste, 30% to 40% Reduction of Electricity, Wuick Recovery of Mature Bio-Film with Q-Pace, Continues Flocking in Equalization Basin; http://www.tvt-bio.com/pdf/winery.pdf; 5 pages; as accessed Aug. 27, 2008.

Aerobic Bioreactor for Lagoon Systems or Land Use; http://tvt-bio.com/ 1 page; as accessed Aug. 27, 2008.

IDS Water, The Information Resource for the Water Industry; http://idswater.com/water/us/USFilter_Memcor_Prodcuts/submerged_membrane_systems/228_0/g_supplier_6.html; 2 pages; as accessed Aug. 27, 2008.

Waste Stream Technology; http://www.wastestream.com/; 4 pages; as accessed Aug. 27, 2008.

SolarBee, Inc.; http://www.solarbee.com/; 1 page as accessed Aug. 27, 2008.

PCT Application PCT/US2009/069283; filed Dec. 22, 2009; Kraig Johnson; International Search Report mailed Aug. 3, 2010.

* cited by examiner

*Primary Examiner* — Christopher Upton
(74) *Attorney, Agent, or Firm* — Thorpe North & Western LLP

(57) ABSTRACT

A system and method are provided for removal of undesirable substances from a body of liquid. The system can include an aeration structure having a continuously inclined surface configured to provide an interaction of air bubbles against substantially an entire length of the continuously inclined surface while the air bubbles are moving toward a top of the body of liquid. The continuously inclined surface can be substantially submerged in the body of liquid. A bio-film of diverse bacteria colonies is disposed on the continuously inclined surface, and a high surface area-to-volume structure is located in proximity to the aeration structure, upon which a bio-film of bacteria colonies can be formed. An aeration system is coupled to an air supply system which releases the air bubbles toward a bottom of the continuously inclined surface, such that the air bubbles move along the continuously inclined surface as they rise so as to (i) create a variety of aerobic-anaerobic conditions at the bio-film and (ii) engage the air bubbles in a continuous mixing of a micro climate for the bio-film in response to an orientation of the continuously inclined surface and (iii) provide airlift circulation of water from bottom to top of the aeration structure.

33 Claims, 14 Drawing Sheets

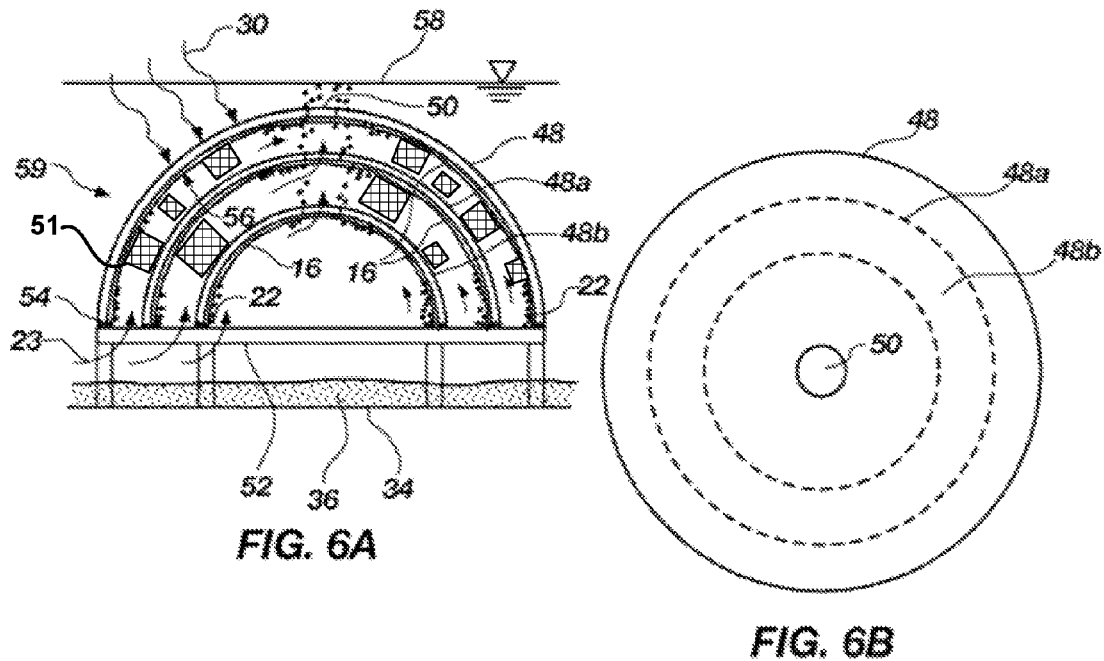
FIG. 6A
FIG. 6B
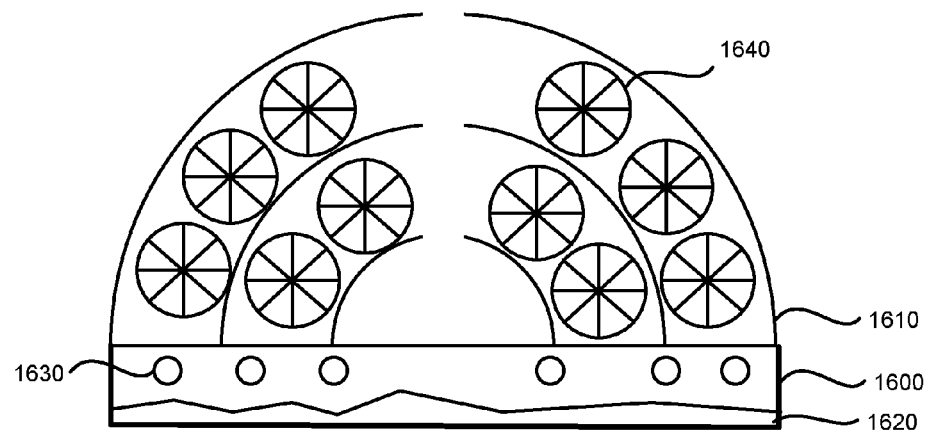
FIG. 6C

SUBMERGED SYSTEM AND METHOD FOR REMOVAL OF UNDESIRABLE SUBSTANCES FROM AQUEOUS MEDIA

PRIORITY CLAIM

Priority is claimed to PCT patent application Serial No. PCT/US2009/0069283 filed on Dec. 22, 2009 which claims priority to U.S. Provisional Patent Applications Ser. Nos. 61/140,041 and 61/140,039, filed Dec. 22, 2008, which are hereby incorporated herein by reference in their entirety.

BACKGROUND

Wastewater treatment lagoons are one of the most broadly used wastewater treatment technologies in the United States. Lagoons as a treatment technology are suited for small to medium-sized rural communities, animal feedlot operations, food production operations, as well as some general industries. The primary advantages of lagoons are low cost and ease of operation. Generally speaking, lagoons can be effective at removing organic material and suspended solids, provided the lagoons are not overloaded.

One disadvantage of most types of lagoon systems is their inability to remove some undesirable compounds, such as carbon, nitrogen, and phosphorous containing compounds and other undesirable substances from wastewater streams. In addition, it can be difficult to reduce biochemical oxygen demand (BOD) and total suspended solids (TSS) in wastewater lagoons. It is these undesirable compounds that increase the stench and subsequent neighbor complaints from lagoon systems. Undesirable compounds are removed from wastewater streams in lagoons by bacteria that break down such compounds.

The breakdown of these compounds is inhibited by several biological factors inherent in the design of an open lagoon. It is also known that the waste secretions from certain strains of algae can reduce growth of desirable bacteria.

Further, trickling filters are one of the oldest forms of wastewater treatment. Rocks or other media are stacked in a basin and wastewater is trickled over the media. A thin bio-film consisting of micro-organisms develops on the surface of rocks and other substrates and is able to remove the organic material out of the wastewater as it flows past the surface. The cross-sectional thickness of the bio-film provides conditions suitable for aerobic bacteria at the free surface, and in some cases, anaerobic bacteria near the less oxygenated substrate zone. Trickling filters are effective at removing compounds from wastewater due to the diversified zones favorable to the growth of different types of micro-organisms that break down organic matter. The fixed media provides a surface for bacteria to attach (the bacteria bio-film remains in place until it becomes so thick that it sloughs off). Oxygen requirements for various bacteria colonies will be met at some point across the thickness of the bio-film.

The primary disadvantages of a trickling filter are the initial capital costs to build the filter, pumping costs to lift the wastewater to the top of the filter, maintenance of the mechanical distribution system at the top of the filter, and ultimate disposal and replacement of the media within the filter.

Other designs that provide surface area for fixed film growth are Rotating Biological Contractors (RBCs), and various designs that place foam blocks and spacers or fibrous material down in the wastewater. RBCs require mechanical rotation systems. Capital costs to reach the equivalent surface area of a trickling filter can be quite high.

BRIEF DESCRIPTION OF THE DRAWINGS

FIGS. 6A and 6B are cross-sectional and plan views, respectively, of an embodiment of aerated submerged bio-film panels wherein the panels comprise nested hemispheres.

FIGS. 6C is a cross-sectional side view of an embodiment of nested hemispheres with a base which acts as an anchor.

DETAILED DESCRIPTION

Figure 1:
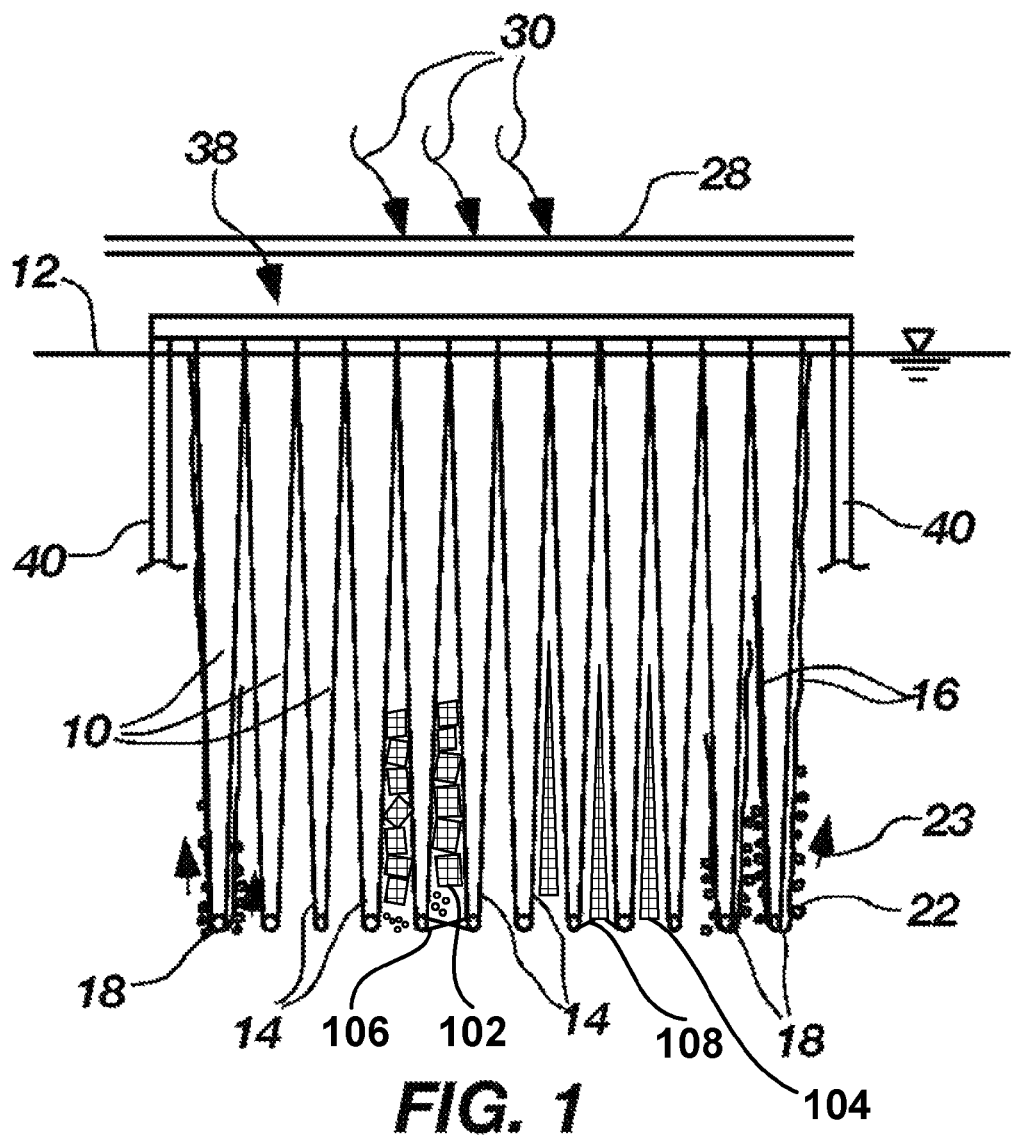
FIG. 1 is a side view of one embodiment of a group of aerated submerged bio-film panels disposed in wastewater.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method are provided to reduce the contents of carbon compounds and other unwanted compounds in a body of wastewater. Specifically, the ammonia nitrogen can be converted to nitrites and nitrates. Nitrates can be removed or reduced to nitrogen gas under an anaerobic environment to prevent algae from growing. Under certain operational conditions, phosphorous compounds can also be removed if cell mass is removed from the system. A variety of submerged bio-film surfaces and conditions can be provided to enable diverse colonies of bacteria to grow. An aeration system creates air bubbles that travel adjacent to submerged surfaces as the bubbles rise to create conditions that benefit aerobic microorganisms in bio-film colonies. While the bubble size may vary, these bubbles will generally be smaller in size to enable useful interaction with the bio-film. Rising bubbles help circulate the contaminated water along submerged surfaces to stimulate growth of microorganisms and thereby remove compounds containing carbon, reduce BOD and TSS, convert ammonia nitrogen to nitrites and nitrates, and with aeration manipulation, remove nitrates and phosphorus containing compounds. Contaminated water is a body of liquid containing some amount of unwanted chemicals, unwanted substances, and/or unwanted organic or inorganic compounds.

The area available for bio-film growth on submerged surfaces may be increased using packing material or other material with high surface area-to-volume and/or weight ratio. The system creates multiple biological zones where aerobic bacteria colonize the bio-film surface to utilize dissolved oxygen (DO) and to remove carbonaceous compounds. In some configurations and with certain operations, this system will also remove nitrogen and phosphorus bearing compounds from wastewater. Anoxic and anaerobic zones may be created as well.

The system operates through the addition of engineered submerged structures that encourage the growth of a bio-film of heterotrophic and other bacteria. Heterotrophic bacteria need several basic conditions to flourish: a surface to adhere to, an adequate supply of oxygen, appropriate temperatures, and a supply of nutrients (e.g., nitrogen and phosphorus). In addition to those above basic conditions, the autotrophic bacteria are nitrifiers and need protection from sunlight to maximize their functions to convert ammonia nitrogen to nitrites and nitrates.

Air is supplied to the submerged bio-film surfaces to enhance oxygen transfer to the bacteria in the bio-film. While the system and method is discussed as related to wastewater treatment, the technology can be used for the treatment of any body of contaminated water to remove compounds containing carbon, convert ammonia nitrogen to nitrate, and uptake phosphorus, whether the contaminated water is considered wastewater or not. For example, other applications of the technology include the treatment of: agricultural irrigation return water, aquariums, anaerobic digester supernatant, food processing effluent, industrial process water, contaminated public waterways, etc.

Figure 2:
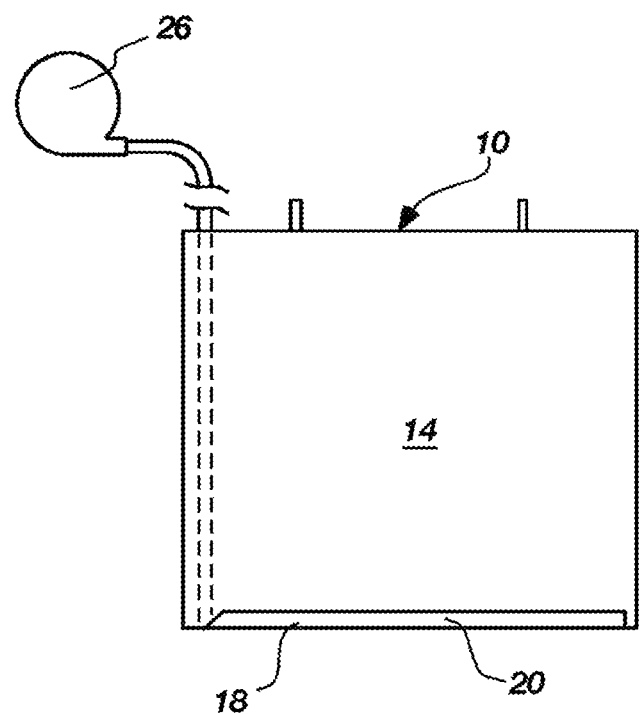
FIG. 2 is a front elevation view of an aerated submerged bio-film panel of FIG. 1.

One embodiment of the fluid treatment system is shown in FIGS. 1 and 2. The system includes one or more panels 10 that are submerged in a fluid 12, such as wastewater. The panels can be made of a variety of materials, so long as the panels are durable in the contaminated water or wastewater environment. Structures that provide the surface area must be able to withstand corrosion while submerged in a wastewater stream for years. High surface area to volume ratio is desired, yet plugging of the media is preferably avoided. It is also desirable that the panels be of materials that are nontoxic. Suitable materials include concrete, plastics, metal, etc. It is even believed that discarded materials such as recycled auto tires and recycled plastic composite can be fabricated into suitable panels for application in the present technology.

Growing on the side surfaces 14 of the panels 10 is a film 16 of heterotrophic, autotrophic bacteria, and possibly other bacteria. The heterotrophic bacteria break down organic carbon compounds to reduce BOD and TSS, followed by autotrophic bacteria to convert ammonia nitrogen to nitrites and nitrates in the presence of bacteria known collectively as nitrifiers, and then the nitrate is converted to nitrogen gas which exits the body of liquid. For instance, a variety of species of nitrifying bacteria can be suitable for the present invention, such as Nitrobacter agilis. All species colonizing this bio-film are naturally-occurring bacteria in the environment. No special species are added for this technology to work. Instead, the technology is simply configured to enhance a naturally occurring process. In one embodiment, the submerged panels may be first inoculated with buckets of trickling filter effluent water (known to be rich in "seed" bacteria).

Disposed at the lower end or edge of each panel 10 is a compressed air conduit 18 with openings 20 that are configured to release air bubbles 22. The compressed air conduit in the panel is connected to a series of other air conduits (24 in FIGS. 3, 4) that are eventually connected to a compressed air source 26 (FIG. 2), such as a compressor. Compressed air is released along the bottom edge of the panels, and as the bubbles rise up, the bubbles contact the bio-film 16 growing on the side surfaces 14 of the panels. The bio-film and water are thus supplied with a continual stream of oxygenated contaminated water. For efficiency, it is desirable to provide an effective bubble size and enough air for the oxygen demand of the bio-chemical processes of the bacteria, without wasting energy by providing more air than is needed. Those skilled in the art will be able to determine suitable aeration levels for this purpose.

While the panels 10 depicted in FIG. 1 (and the other figures herein) are shown with non-vertical surfaces, the bio-film panels of the present invention could be vertical or configured with vertical sides. However, panels with sloping or non-vertical surfaces are preferred, so as to continually force the air bubbles 22 against the surface of the bio-film 16 as they rise, rather than allowing the bubbles to be deflected outwardly away from those surfaces. A relatively small non-vertical angle is sufficient to provide this function. For example, the panels 10 shown in FIG. 1 have an angle of about 2-3° from the vertical. It is believed that even smaller angles could still provide the desired bubble contact time benefit. At the same time, greater angles (i.e. surfaces that are closer to horizontal) will tend to slow the rate of rising of the air bubbles, thus increasing contact time of the bubbles with the bio-film. This can be desirable for shallower wastewater lagoons, or for other reasons.

Irregular surfaces can also help provide the desired bubble contact. For example, aeration structures or panels can have uneven surfaces, pits, or voids throughout their structure. When the surfaces are irregular or imperfect then the imperfections can provide small microclimates in the panel. For example, these microclimates may created by having small areas with a different angle than the overall panel or by providing a small non-inclined or non-vertical areas on the surface of a panel.

The rising bubbles 22 also create flow patterns in the contaminated water, represented by arrows 23, pulling the contaminated water up from the bottom of the body of contaminated water along the bio-film surfaces 16, and thereby enhancing circulation to promote a high level of treatment of wastewater. Accordingly, the bio-film is thus supplied with a continual stream of nutrient rich contaminated water, in addition to the needed oxygen.

The aeration structure can also have additional structures located within the voids or hollow areas of the aeration structure. A high surface area-to-volume structure 102 can be provided in proximity to the aeration structure, upon which bio-film layers can be formed. Some bubbles provided by the aeration system may pass through the high surface area structure. The high surface area structure can be located or nested between a first and a second aeration structure or first and second wall, as illustrated. Alternative configurations for nesting the high surface area-to-volume structures in within varying aeration structure configurations will be discussed later.

In FIG. 1, the high surface area structure is illustrated as a cube type 102 of structure where the internal portion of the cube contains plastic fingers that extend into the cube and are interlaced to provide large amounts of surface area. High surface area structures are not limited to cube shapes and can be any other suitable shape. For example, a triangular shape 104 for a high surface area structure is illustrated. The high surface area-to-volume structure may be a structure that has surface area anywhere from 2 times up to 150 times the volume of the structure. For example, a one meter cube structure may contain up to 150 square meters of surface area for bio-film to grow on.

The types of material that can be used to provide high surface area-to-volume ratios can include lightweight plastic packing material, sponges, loosely wound filaments, loosely woven thick filaments, or other similar high surface area materials. In one embodiment, chopped plastic (e.g. PVC), chopped tires, molded recycled plastic, or other materials can be used. In addition to high surface area-to-volume material, high surface area-to-weight packing media can also be used.

The high surface area-to-volume structure may be held in place by a retainer. The types of retainers that can be used may include, but are not limited to, netting 106 or one or more flanges 108 as illustrated in FIG. 1. A wire guide line may be threaded through the high surface area structures and then tied to a part of the aeration structure to hold the high surface area structures in place. As mentioned, there may also be a retainer structure at the bottom of the aeration structure such as a plurality of flanges or a grill structure. Alternatively, there may be pegs that extend from the aeration structure upon which the high surface area structures can be inserted and hung in place.

Using the high surface area structure that has comparatively low volume in combination with the aeration structure provides a variety of environments in which bio-film can develop. One type of environment is an aerobic environment created by the aeration system using the bubbles which enable aerobic bacteria to grow at the free surface of a bio-film on the high surface area-to-volume structure and anaerobic bacterial growth is promoted in the reduced oxygenated area of the bio-film that is close to the substrate of the submerged structure. The high surface area structure will also be a moderately aerated zone, because some bubbles will readily flow through this area to provide oxygen. Finally, the bio-film environment near an inner wall (or opposing wall) of the aeration structure can be substantially anoxic because this area is not directly aerated. In some configurations, anaerobic zones may be created. In particular, forming diverse zones with a variation of oxygen content creates: a highly aerated zone, a moderately aerated zone and a non-aerated zone. These zones allow multiple kinds of bacteria to grow in each of the respective zones.

Since the dissolved oxygen is not uniformly distributed within the submerged surfaces and packing media, it creates a complex, multi-aerated system that allows different bacteria types to thrive and to consume a variety of undesirable materials in the contaminated water. Specifically, the aerobic zones have bacteria that can consume carbonaceous material and convert the carbon into carbon dioxide ($CO_2$) Ammonia can also be removed from wastewater. First, aerobic nitrification takes place in the aerobic zones. Then, anoxic denitrification takes place that outputs nitrogen gas ($N_2$). As the air bubbles move contaminated water vertically through the aeration structure, they enhance the described biological processes.

The submerged aeration structure can have a rough surface 10 to promote bio-film growth. An example of one rough surface is where sand granules are either attached to or formed directly into the aeration structure to provide more surface area for bio-film growth. Of course, other types of non-uniform or rough surfaces can be created on the aeration structures as needed. Starter colonies for these naturally occurring bacteria can also be introduced into the system in order to increase the speed at which the bio-film matures. For example, starter bacteria can be painted on or embedded into the surface of aeration structure or pumped into the body of the aeration structures or contaminated water body to accelerate the desired biological processes. In addition, external nutrients to help promote fast growth of bacterial colonies can be added to wastewater to encourage the formation of the bacteria.

Nitrifying bacteria in the bio-film 16 may be inhibited by direct sunlight. Accordingly, in the embodiment of FIG. 1, the assembly of submerged panels 10 may be covered by a light barrier 28. The light barrier can be a roof, a cover (such as a cover that floats on the surface of the contaminated water), or any comparable structure which shields the submerged bio-film from sunlight (represented by arrows 30). The light-shielded environment encourages the growth of nitrifying bacteria and prevents algae growth. Other embodiments of the submerged panels also help shield the bio-film from sunlight, as discussed below.

The size of the panels 10 can vary within a wide range. In an embodiment consistent with FIGS. 1 and 2, the bio-film panels may be about 2 feet tall. However, this system can be used in bodies of contaminated water of any depth, limited only by the survivability of the bacteria. For example, it is believed that the present system can be adapted to treat salt water or sea water, with the appropriate bacteria. Accordingly, the panels can be made to whatever size needed to extend to the desired depth.

Figure 5:
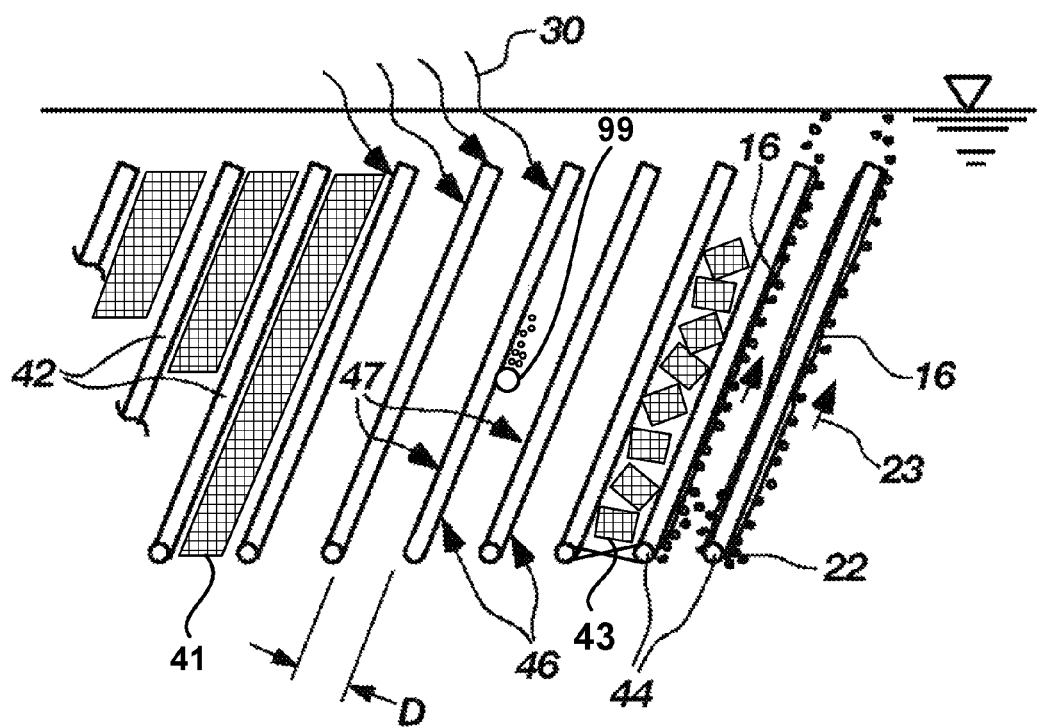
FIG. 5 is a side view of an alternative embodiment of aerated submerged bio-film panels comprising a plurality of planar panels arranged so as to block sunlight from each other.

In deep lagoons, long panels may be used where only the top portion may be oxygenated using an air outlet 99 or oxygenation attachment at a middle depth of the panel, as illustrated in FIG. 5. Of course, the air outlet may be more toward the top or bottom of the panel or anywhere in between as desired. This configuration can facilitate anaerobic conditions on a lower portion of the panel, as well aerobic conditions on an upper portion of the panel, which results in a variety of environments on a single panel. As a result, different types of bacteria can grow in these different zones.

Figure 3:
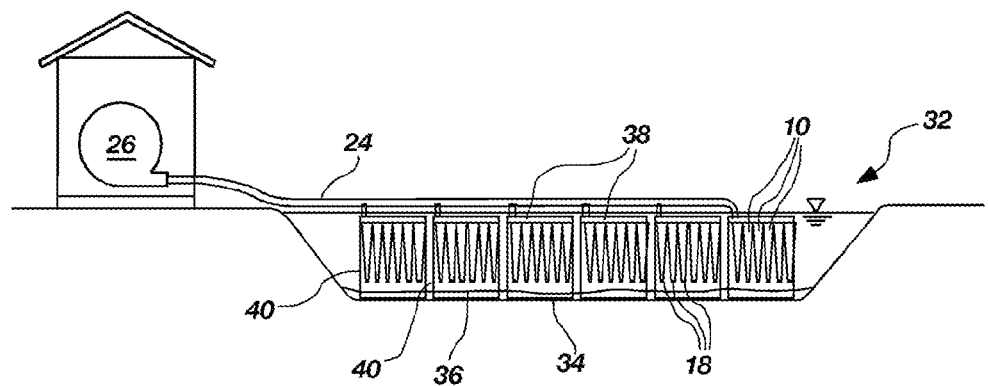
FIG. 3 is a cross-sectional view of a wastewater treatment lagoon having a plurality of aerated submerged bio-film panels mounted on frames resting on the bottom of the lagoon.
Figure 4:
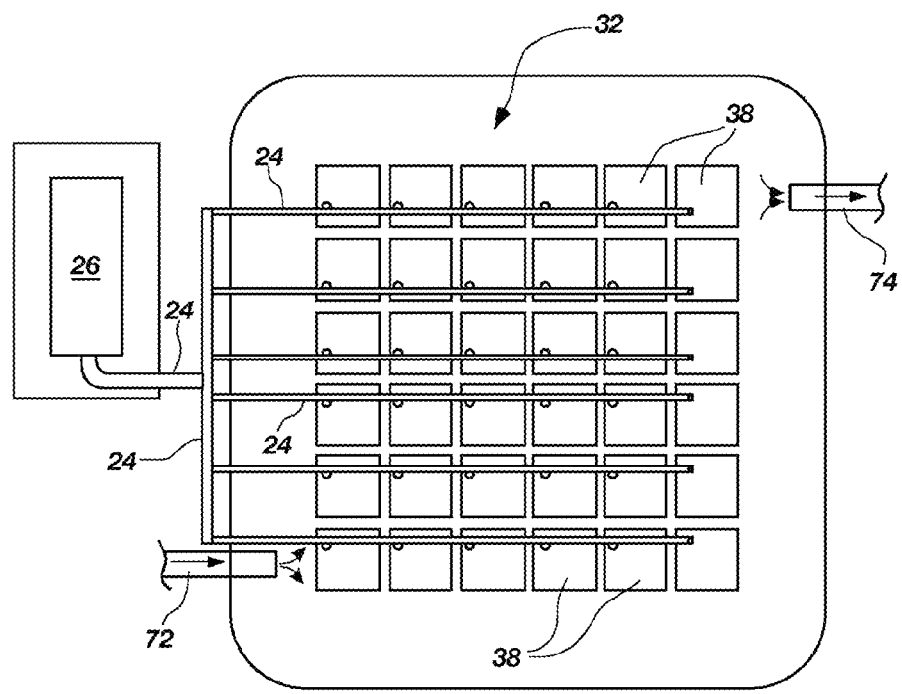
FIG. 4 is a plan view of the wastewater treatment lagoon of FIG. 3.

As a practical matter, however, most wastewater treatment is carried out in relatively shallow lagoons or reservoirs, such as the lagoon 32 shown in FIGS. 3 and 4.

In such lagoons, the bottom surface 34 is generally covered by a layer 36 of unconsolidated sediments and solids that have settled out of the wastewater. It is generally desirable to dispose the bio-film panels above this sediment layer. The panels can extend above the top surface of the contaminated water, but do not need to do so. In areas where ice covers lagoon systems in the winter, the structures can either be submerged below a level where the ice layer forms, or be heavy and/or strong enough to remain in place when pushed by wind-driven ice. The circulation of contaminated water can also impede the formation of ice around an aeration structure and its top vents. However, where the contaminated water level in the lagoon can fluctuate, the panels can be configured with a height corresponding at least to the minimum contaminated water level.

In the lagoon system shown in FIGS. 3 and 4, a plurality of groups or modules 38 of submerged bio-film panels 10 are supported on individual frames or racks 40 which rest upon the bottom 34 of the lagoon 32. These groups of panels are all interconnected by compressed air conduits 24 that lead to the compressed air source 26. A power source, control devices, pressure regulators, and other components needed for operation of the aeration system are not shown, but their use and specification is within the knowledge of one skilled in the art. It will also be apparent that the compressor or other compressed air source can be capable of providing air at a suitable pressure and volume, depending on the depth of submersion of the compressed air conduit 18 at the lower end of each panel and the number or size of the aeration structures being supplied with air.

A plurality of modules 38, each comprising one assembled rack 40 of bio-film panels 10, can be placed into an existing lagoon at a desired spacing, and then interconnected to the compressed air source 26 to begin operation. If needed, the lagoon or individual aeration structures can be charged with bacteria, and after the bacteria has become established, waste material in the wastewater flowing though the lagoon will be continuously removed.

While the bio-film panels 10 shown in FIGS. 1-5 have a wedge-shaped configuration with planar sides, other configurations can also be used. The panels may be any suitable geometry, and are not limited to the examples illustrated, and include any geometry with curved or flat surfaces disposed vertically or non-vertically, with bubble systems to provide bubbles traveling along the surface. Preferably, the surface that supports the bio-film is neither horizontal nor vertical, so that rising bubbles travel along the surface.

As one example, shown in FIG. 5, substantially planar bio-film panels 42 can be oriented at an angle and nested together in a group. Each panel includes an air conduit 44 at its lower extremity, allowing air bubbles 22 to be released to rise up the surfaces of the panels. These individual panels could be supported by a submersible frame similar to that shown and described with reference to FIG. 3. High surface area-to-volume structures 41, 43 can be provided in proximity to the aeration structure, upon which bio-film layers can be formed. As illustrated the high surface area-to-volume structures can be loose blocks 43 or a structure formed to fit between the layers of the aeration structure 41.

The configuration shown in FIG. 5 can provide several advantages. First, the submerged panels 42 can be placed at a spacing D that is small enough to allow the upper portion of each panel to help block sunlight 30 from the surfaces of an adjacent panel. Such a configuration can reduce or eliminate the need for additional light shielding. Additionally, it is believed that sufficient reduction of the spacing D can allow the air bubbles 22 to oxygenate both the downward-facing surface 46 of a panel, and at least partially oxygenate the opposing upward-facing surface 47 of the adjacent panel. This can allow both side surfaces of the planar panel to support a bio-film 16 of bacteria, thus possibly multiplying the effectiveness of each panel.

Alternatively, bio-film panels in accordance with the present invention can be formed in other shapes, such as curved surfaces, ellipses, elongated shells, parabolic shells or other curved inclined surfaces that are configured for submersion in contaminated water. For example, in one embodiment shown in FIGS. 6A and 6B, the submerged bio-film shell comprises a hemisphere or partial dome 48, which has an opening 50 at its top to allow air bubbles 22 to escape. The hemisphere can be configured to rest upon a frame 52 on the bottom 34 of the wastewater lagoon, with a compressed air conduit 54 disposed around the bottom of the shell to provide the air bubbles. Placing the bottom of the hemisphere above the bottom of the lagoon is desirable to allow contaminated water to circulate, as shown by arrows 23, and enter the lower end of the hemisphere. High surface area-to-volume structures 51 can be provided in proximity to the aeration structure, upon which bio-film layers can be formed.

The hemisphere 48 naturally shields its inner surface 56 from sunlight 30, so that a bio-film 16 of bacteria can grow thereon. The bubbles 22 released from the air conduit 54 travel up the inner surface, providing oxygen to the bacteria and helping to circulate the contaminated water, until reaching the top opening 50, where the bubbles naturally rise to the surface 58 of the contaminated water. The use of a shell can be desirable for situations where it is impractical or undesirable to cover an entire lagoon to block sunlight. A plurality of shells can be placed into a lagoon, and by their own geometry provide the appropriate conditions for growth of the bacteria.

The hemispherical shell configuration can comprise multiple nested, concentrically disposed hemispherical shells in a module 59, as shown in FIGS. 6A and 6B. Like the outer shell 48, the inner shells 48a and 48b are each shielded from sunlight 30 by their own structure, and by the next outer shell. While only two inner shells are shown, it will be apparent that the number of nested shells is not restricted to this number. These nesting shells can be supported on the same frame 52, and all function in the same way as the outer shell to provide a growing surface for bacteria and to provide oxygen to the bacteria. Additionally, as with the nesting panels of FIG. 5, the nesting shells can be placed close enough together that nitrifying bacteria can flourish on the outer surfaces of the inner nested shells, and increase the performance of the system.

Alternatively, the nesting shells can be supported on a closed base structure as shown in FIG. 6C. In order to overcome the buoyancy created by the bubble flow within the aeration structures and the high surface area-to-volume structures 1640, some embodiments of the structure may have a bottom section 1600 that sits directly on the bottom of the lagoon and the bottom section can be attached to the upper sections 1610, and the bottom section may act as an anchoring structure. The bottom section can be filled with ballast 1620 such as sand, cement blocks, rocks, poured cement or other relatively heavy items to weigh down the aeration structure. This bottom section or anchoring structure can have holes 1630 that are one or more inches in diameter and the holes can allow liquid to flow through the bottom section. The base may be just a few inches in height or up to a few feet in height as desired. The use of the closed base structure can be employed with any shell shape (e.g., pyramids, hemi-spheres, cubes, pipes, etc.) The base can be attached to the shells by any known method. For example, the base can be attached to the shells using heat welding, mechanical fasteners, bolts, glue or other means of fastening. In addition, the base structure can be manufactured as a single structure or single unit with the shells. Attachment straps may be attached to the base and then affixed to the lagoon floor to stabilize the aeration structure.

Figure 7A:
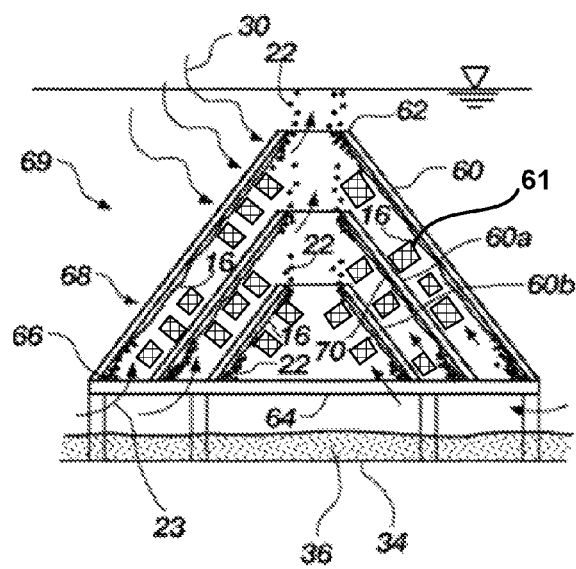
FIGS. 7A and 7B are cross-sectional and plan views, respectively, of an embodiment of aerated submerged bio-film panels wherein the panels comprise nested pyramids.
Figure 7B:
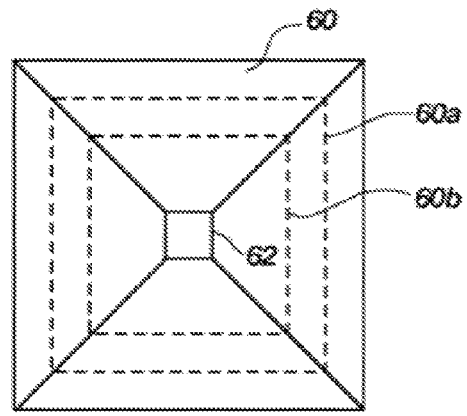

In addition to curved shells, non-curved shells can also be used. Shown in FIGS. 7A and 7B is a pyramidal shell 60. Like the hemispherical shell 48, the pyramidal shell includes an opening 62 at its top to allow bubbles to escape, and is supported on a frame 64 resting on the bottom 34 of the lagoon 32, with air conduits 66 disposed at the bottom of the shell. The outer surface 68 of the shell blocks sunlight 30, allowing a bio-film 16 of nitrifying bacteria to grow on the inner surface 70. Air bubbles 22 released from the air conduit rise up the substantially planar inner surface, as indicated by arrows 23, providing oxygen to the bacteria and circulating the contaminated water.

As with the hemispherical shell module 59, a pyramidal shell module 69 can comprise nested shells, shown in FIGS. 7A and 7B. The inner pyramidal shells 60a and 60b are each shielded from sunlight 30 by their own structure, and by the next outer shell. While only two inner shells are shown, the number of nested shells is not restricted to this number. These nesting shells are supported on the frame 64, and function in the same way as the outer shell. As shown in FIG. 7B, the pyramidal shells that are illustrated may have a substantially square plan shape, which can make them more space efficient than the hemispherical shells. This shape, comprising substantially flat panel components, may also be easier to fabricate and less expensive. High surface area-to-volume structures 61 can also be provided in proximity to the aeration structure, upon which bio-film layers can be formed.

While two shapes of shells and nesting shells are shown, it will be apparent that other shapes can also be used. For example, a conical shell or series of nesting conical shells can be used. It will also be apparent that non-hemispherical curved shells can be used, and these can be selected for their effect on the rate at which the bubbles 22 rise. Because the hemispherical shell 48 provides a curved inner surface 56, the rate of rising of the bubbles 22 will vary with height. This can provide different contact time of the bubbles with different regions of the bio-film. Nevertheless, the shape of the shell can be selected to provide different rise rates of the bubbles. For example, rather than a hemispherical shell, an elliptical, parabolic, or hyperbolically curved shell could be used. Other curved and non-curved shapes can also be used.

A system incorporating submerged aerated bio-film modules can be used in a variety of situations to remove undesirable compounds from contaminated water. As described in more detail below, the technology can be adapted to batch treatment applications, wherein a fixed volume of contaminated water is contained and treated for a period of time. However, it is believed that perhaps the most common application will be in continuous-flow wastewater treatment lagoons, particularly lagoons originally designed as non-aerated lagoons. Such lagoons can be configured like the earthen lagoon 32 shown in FIGS. 3 and 4. Alternatively, concrete-lined lagoons with vertical side walls, and even above-ground reservoirs, tanks, or basins can be adapted for treatment of contaminated water according to the present invention. Indeed, the present invention can be applied in any body of contaminated water.

The lagoon of FIGS. 3 and 4 is part of a flow-through or constant flow system, wherein influent enters the lagoon through an inlet 72, and effluent continuously flows out through an outlet 74. Such lagoons are generally sized to allow the contaminated water to be located in the lagoon for the desired treatment. Those of skill in the art will be able to calculate the quantity of submerged aerated bio-film modules required for a lagoon having a given flow rate.

Figure 7C:
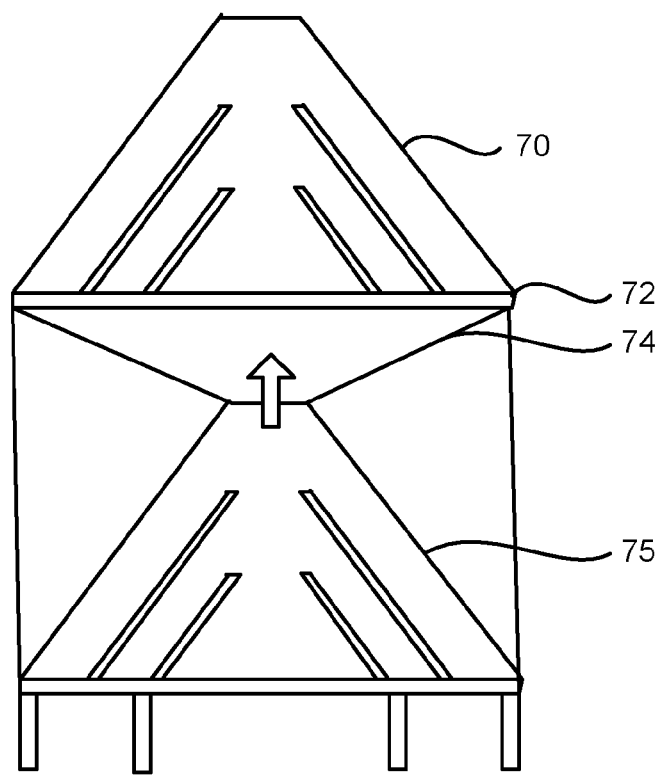
FIG. 7C illustrates a second aeration structure with an inlet of the second aeration structure vertically connected via a conduit to an outlet of the first aeration structure in an embodiment of the invention.

FIG. 7C illustrates a second aeration structure 70 with an inlet 72 of the second aeration structure vertically connected via a conduit 74 to an outlet of the first aeration structure 75. This enables contaminated water to circulate through two aeration structures in a vertical manner using air lift action.

Figure 7D:
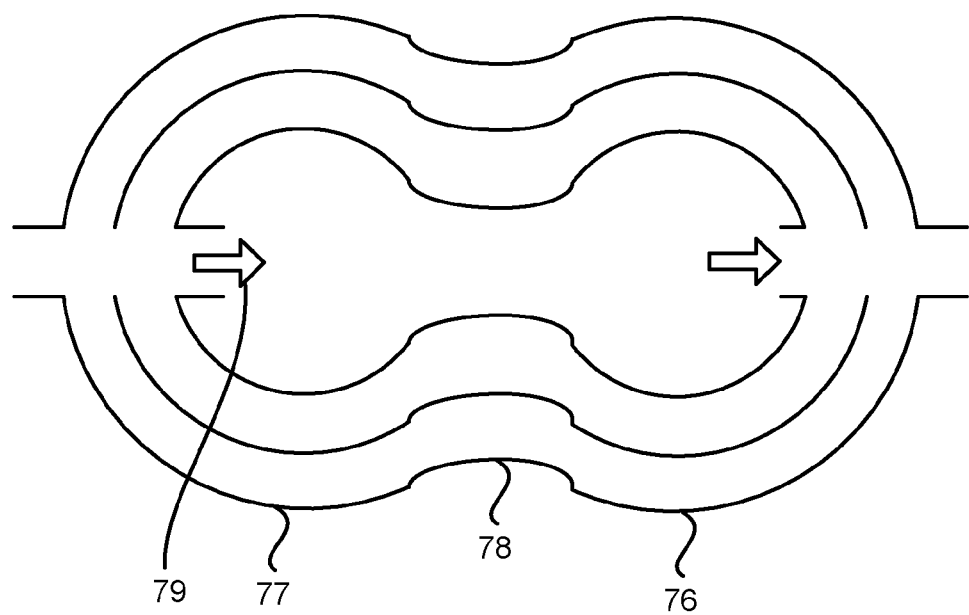
FIG. 7D illustrates a plan view of a second aeration structure with an inlet of the second aeration structure horizontally connected to an outlet of the first aeration structure in an embodiment of the invention.

FIG. 7D illustrates a plan view of a second aeration structure with an inlet of the second aeration structure 76 horizontally connected to an outlet 78 of the first aeration structure 77. As the contaminated water moves through a lagoon, then the contaminated water can move sequentially through these adjoined aeration structures. The arrows 79 indicate the bulk movement of contaminated water through the aeration structure in FIG. 7D.

Figure 8:
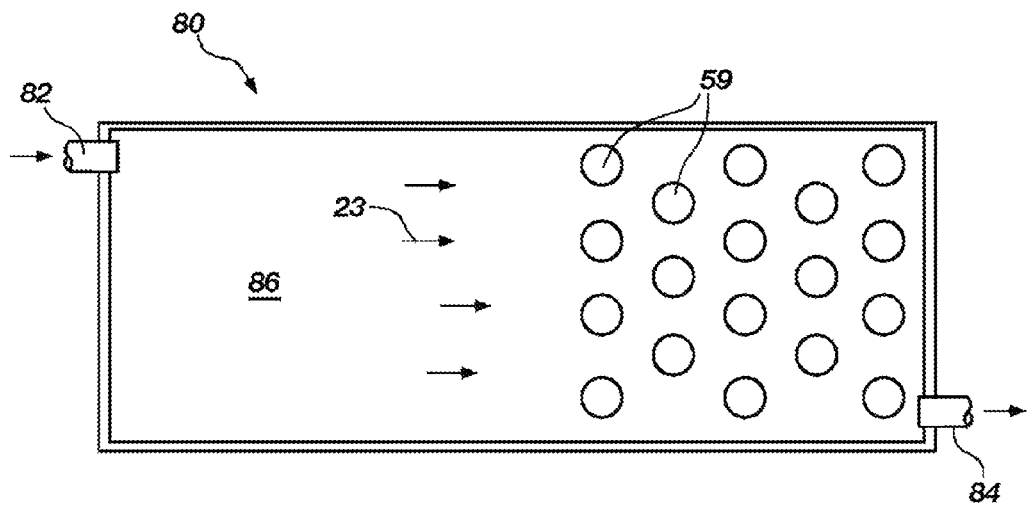
FIG. 8 is a plan view of an open flow treatment lagoon having a plurality of hemispherical modules disposed in a group therein.
Figure 9:
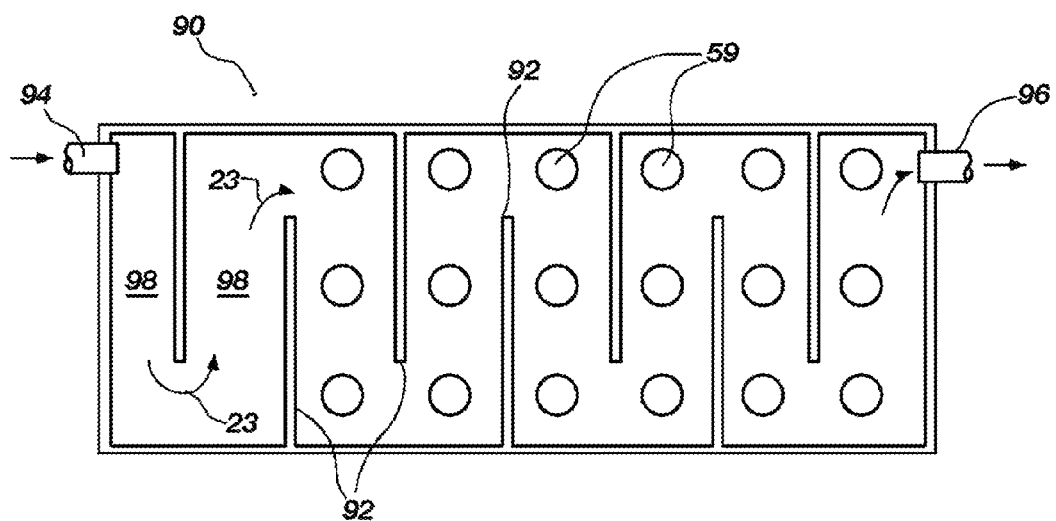
FIG. 9 is a plan view of a channeled flow treatment lagoon having a plurality of hemispherical modules disposed in series therein.

Alternative continuous-flow treatment configurations are shown in FIGS. 8 and 9. Shown in FIG. 8 is a submerged aerated bio-film treatment system comprising a plurality of submerged hemispherical modules 59 disposed in an open-flow lagoon or reservoir 80. Contaminated water enters the lagoon through the inlet 82, and gradually flows toward and past the submerged bio-film modules as it works its way toward the outlet 84. The submerged modules are grouped toward the outlet in order to provide a settling area 86 toward the inlet. This settling area provides a region in which suspended solids and organic material can settle out of the contaminated water before encountering the submerged bio-film modules. This helps to reduce the level of organic material in the contaminated water by the time the contaminated water reaches the submerged modules.

FIG. 9 illustrates an alternative continuous-flow treatment system comprising a channeled lagoon 90 having a series of baffles 92 that force the contaminated water to flow along a serpentine path from the inlet 94 to the outlet 96. The submerged hemispherical modules 59 are arranged in series through the channeled lagoon, thus causing the contaminated water to traverse each module as it passes through the lagoon. Like the open-flow lagoon 80 of FIG. 8, the channeled lagoon 90 includes a settling area 98 near its inlet to provide a region in which suspended solids and organic material can settle out of the contaminated water before encountering the first submerged bio-film modules. The channel illustrated may be of variable widths along the flow line to regulate the retention times in and around the aeration devices.

Figure 10:
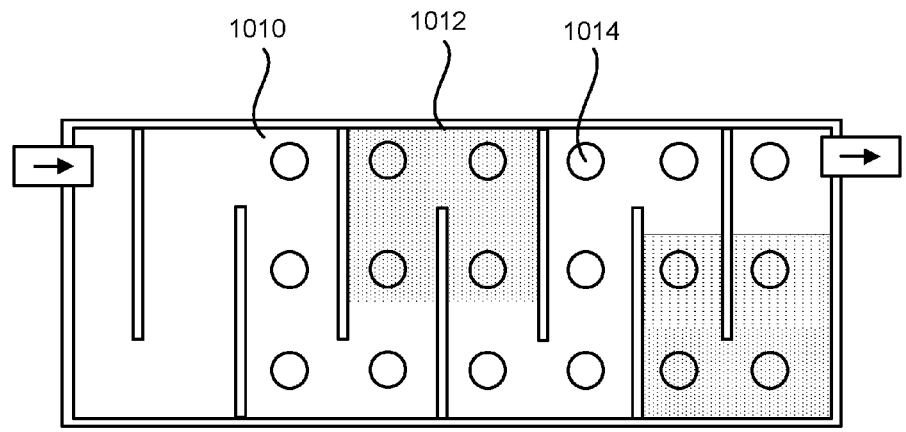
FIG. 10 illustrates a zoned aeration system in an embodiment.

A circuit channel can also include an aeration system that forms zones of aeration in the body of contaminated water. In one embodiment, a plurality of the aerations structures 1014 can be located in the circuit channel, as illustrated in FIG. 10. At least one portion of the circuit channel may have an aeration system 1010 that forms aeration zones. In addition, there may also be at least a second portion of the circuit channel that will have no aeration system 1012. Of course, there may also be multiple aeration zones and multiple non-aeration zones, as desired. Typically there will be several aerated zones and non-aerated zones to allow the appropriate bacterial processes to take place. As the contaminated water passes through the circuit channel at a slow rate of speed, then the carbonaceous, nitrogenous, and phosphorous compounds in the contaminated water will be consumed by the different types of bacteria in each zone, as discussed previously.

The use of multiple aeration zones provides zones that are more aerobic and non-aerated zones that are anoxic. The portions of the circuit channel that have an aeration system can form bacteria zones where aerobic bacteria colonize the bio-film surface to utilize dissolved oxygen (DO). The portions of the circuit channel without an aeration system can develop zones where anaerobic bacteria develop colonies.

In one embodiment of the system, the aeration zones may have different amounts of (dissolved oxygen) DO. For example, a first portion of the circuit channel may be highly aerated, and a second portion of the circuit channel can have a moderate amount of DO. Then a third portion of the circuit channel may have a low amount of DO. Finally, a fourth portion of the circuit channel may be anoxic or even anaerobic.

Since the dissolved oxygen is not uniformly distributed between each of the zones, this helps create a complex, multi-zone system that allows different bacteria to thrive in the varying zones and break down the undesirable substances. The zone variations also work in combination with the varying zones within the aerations structures themselves. More specifically, these variations in aeration zones can work in combination with high surface area-to-density structures located in the aeration structures and inner and outer surfaces in each aeration structure, as described previously.

In an alternative process used with the lagoon in FIG. 10, the zones can be moving zones of aeration. This means that aeration may move through the zones at the same rate as the bulk of contaminated water moves through the channel or pond. Alternatively, the aeration zone may move at a rate that is faster or slower than rate of the bulk contaminated water movement. In this way, effluent water may contain reduced contaminants or high levels of contaminants when a portion of the bulk contaminated water reaches the end of the system.

Figure 11:
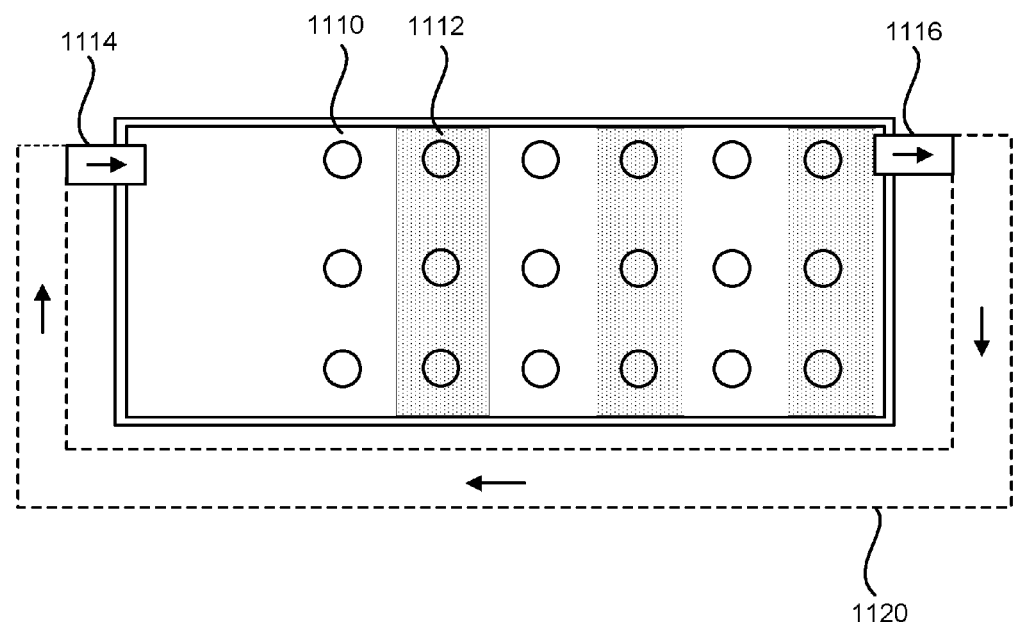
FIG. 11 illustrates a zoned aeration system in another embodiment.

An alternative configuration for the aeration system with zones is illustrated in FIG. 11. This illustrates aeration zones without a circuit system. Specifically, the aeration zones 1110 and non-aeration zones 1112 do not have walls separating the zones but the contaminated water passes through these different zones as contaminated water moves slowly from the inlet 1114 to the outlet 1116 of the lagoon or holding tank. The illustrated zones are either constantly aerated or constantly without aeration. In this way, the bulk movement of the contaminated water is used to move the contaminated water through aerated and non-aerated zones and so different contaminants can be consumed in the varying zones.

A recycling channel 1120 may be added to the outlet 1116 of the lagoon or holding tank, which recycles the output of the system directly back to the inlet 1114 of the lagoon. Using a recycling channel increases cell recycling and residence time. This can help a system recover if the treatment lagoon or channel experiences an unexpected toxic shock which damages the bio-film and most of the bacteria are inhibited. In other words, the recycling system can help accelerate the recovery of bio-film from toxic shocks. In addition, the level of contaminants can be diluted by recycling. Specifically, the recycling channel allows the contaminated water to be re-treated by the system and this can result in cleaner water each time the contaminated water passes through the system. This recycling structure can be applied to any of the lagoon or channel structures described herein.

Figure 12:
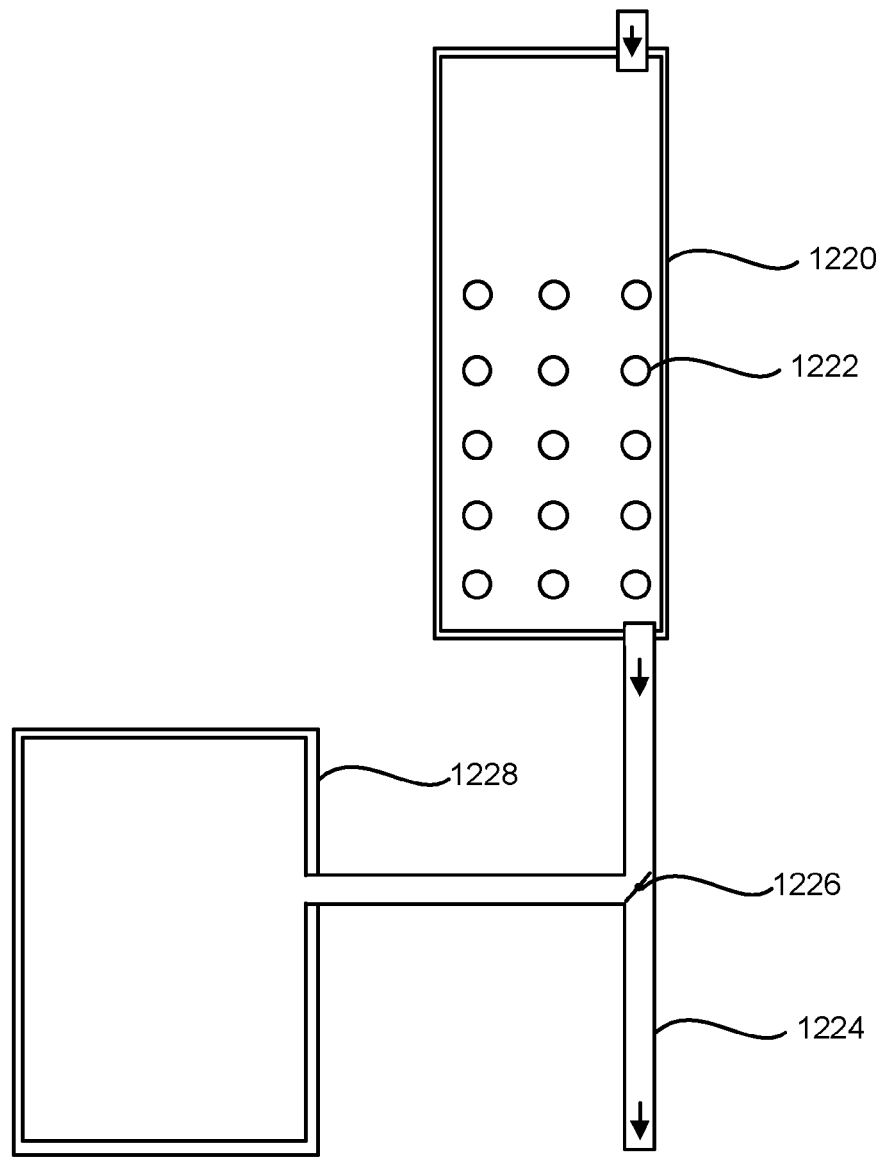
FIG. 12 illustrates an aeration system configured to provide aeration to a lagoon or holding tank in an embodiment.

FIG. 12 illustrates an embodiment where the aeration system is configured to provide aeration to a lagoon or holding tank 1220 for a first timed period and then the aeration system is turned off for a second timed period. In this configuration, all of the aeration systems for the lagoon are turned on or off simultaneously. Turning on the aeration system enables the bio-film on the aeration structures 1222 to aerobically uptake phosphate compounds from the wastewater. The contaminated water that is processed during the aerobic period can be discharged via a primary discharge conduit 1224. Later when the aeration system in the body of contaminated water is turned off, then the phosphate compounds are disgorged from the bio-film and can be diverted via a valve 1226 through a secondary discharge conduit and held in a separate retention lagoon 1228 or pond.

Cycling alternatively between anaerobic and aerobic conditions over time (turning the air on/off) can trigger polyphosphate accumulating organisms (PAOs) to uptake and remove phosphorus from contaminated water during the aerobic conditions. More specifically, the PAOs can be triggered to remove phosphorous by cycling the system between aerobic conditions and anaerobic conditions as the contaminated water moves through a channelized system. Later when anaerobic conditions are imposed, the same organisms will disgorge the phosphate compounds. When certain conditions are met, these organisms may uptake additional phosphorous in a luxury uptake mode due to the previous starvation from phosphorous. This can result in even larger amounts of phosphorous being removed from the system.

These timed sequences can be applied to an entire lagoon system by diverting the effluent containing the disgorged phosphorus compounds during anaerobic periods into a collecting lagoon while allowing effluent during aerobic absorption periods to be normally discharged.

Alternatively, the timed sequences can be applied to portions of the lagoon system that are controlled by channel walls and valve systems. For example, this may allow one half of the lagoon to be aerated and the other half to be non-aerated. Accordingly, this allows one portion of the lagoon to be shunted into the phosphorous collection lagoon while the other portion of the lagoon continues in aeration mode. Then the process would be switched for the opposing sides.

These timed sequences for up taking and removing phosphorous may occur over the period of several days or weeks. For example, the time period when aeration occurs may be a week long and then the time period when the phosphorous is removed from the pond may be one day long. Alternatively, the aeration period can be 3 to 4 days long and the phosphorous removal period can be 8 hours long. These periods can be varied to optimize the aeration and removal periods, as desired.

In one example, the aerobic cycle may be many cycles that are aerated and aerobic for 6-12 hours and many cycles that are non-aerated for 6-12 hours. Other examples of the cycle times might be 3-hour cycles, 18-hour cycles or 24-hour cycles depending on the contamination of the water being treated. When the appropriate number of aeration and non-aeration cycles has passed based on the concentration of contaminants, then the bacteria microclimate undergoes a change from aerobic to anoxic multiple times. Finally, an anaerobic cycle can be extended to an entire 24 hour period. This results in disgorgement of the phosphate compounds which can then be shunted off as described.

The variables of (i) retention time, (ii) distribution of aeration within the lagoon and submerged inclined surfaces and packing material, and (iii) the amount and spatial distribution of organic loading directly affect the removal of contaminants of nitrogen, phosphorous, and carbon compounds. Each of these variables can be modified based on the compounds desired to be removed.

Figure 13:
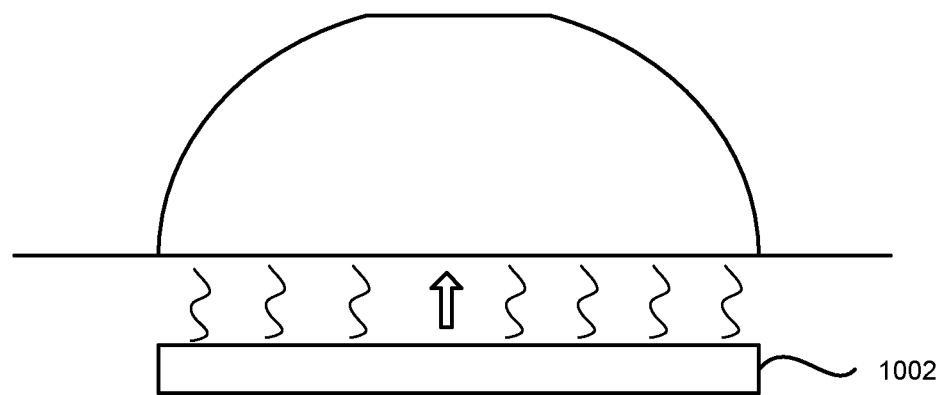
FIG. 13 illustrates an aeration system with a heater located in proximity to the aeration structure in an embodiment.

FIG. 13 illustrates a system for removal of undesirable substances from a body of liquid. In this embodiment, a heater can be located in proximity to the aeration structure configured to provide a warmer environment for the bio-film. This heater may be a water heater 1002 located at the bottom of the aeration structure. The water heater can be configured to heat water that will travel up through the aeration structure and promote bio-film growth.

Figure 14:
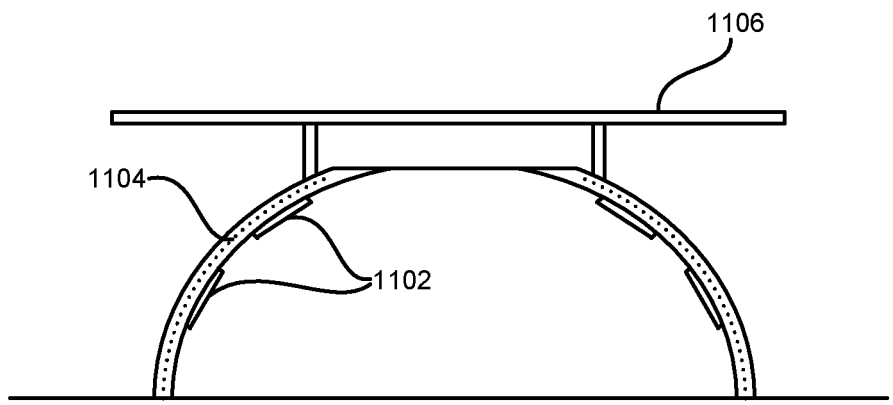
FIG. 14 illustrates an aeration system with a heater source located on an interior wall of an aeration structure or in the aeration structure itself in an embodiment.

FIG. 14 illustrates that a heater source can be placed on an interior wall surface of the aeration structure 1102. This illustration of the heater source thickness has been exaggerated for descriptive purposes but the heater can be a strip line heater, a flat ceramic heater or another somewhat flat heater that can be place on the aeration structure. Alternatively, electrical heating elements 1104 can be embedded within the material of the aeration structure and configured to heat the aeration structure and in turn the surrounding contaminated water. In one embodiment, an air heater source in the air supply system can provide heated air bubbles which pass through passages within the aeration structure to promote bio-film growth. In a similar manner, air channels can be carved into the surface of the aeration structure to guide heated air bubbles that promote bio-film growth. This heating action can also inhibit ice formation at the top of the aeration structures.

In an alternative embodiment, also illustrated in FIG. 14, a heater source may be a solar heater associated with a solar heat collection structure 1106. A solar heat collection structure 1106 may be attached to, or located near, an area that is adjacent to the aeration structure 1102. This allows the solar heater to heat the contaminated water adjacent to the aeration structure to improve the overall temperature of the contaminated water without directing sunlight onto the aeration structure itself which may kill the bacteria.

In addition, solar heated, contaminated water can be passed through coiled tubing that passes under the aeration structures. This enables the contaminated water to be heated in an environmentally friendly manner. Similarly, photovoltaic solar collection device can be used to collect electricity that will then be used to drive the air pumps. Likewise, windmills can be used to provide power to the air supply system to inject compressed air at the bottom of the continuously inclined surfaces.

Figure 15:
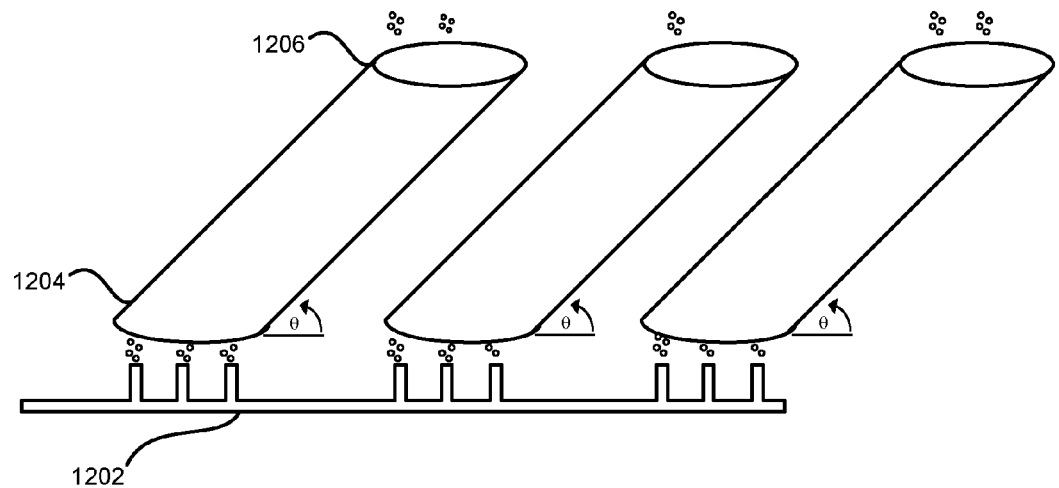
FIG. 15 illustrates an aeration system configured to use a plurality of inclined pipes or tubing in an embodiment.

FIG. 15 illustrates an aeration system configured to use a plurality of inclined pipes or tubing in an embodiment. Air is pumped through a manifold 1202 and can exit a plurality of spouts to enter the first end 1204 of the pipes or tubes. A variety of inclines or changes to the inclines can be used. The pipes or tubes can have an inclination angle of theta ($\theta$) and the inclination of the pipes may vary from 0 degrees to 90 degrees. The air bubbles can travel against the inclined surface of the pipes or tubing which have the bio-film coating, and then the bubbles can exit out of the opposite end 1206 of the pipe.

Figure 16:
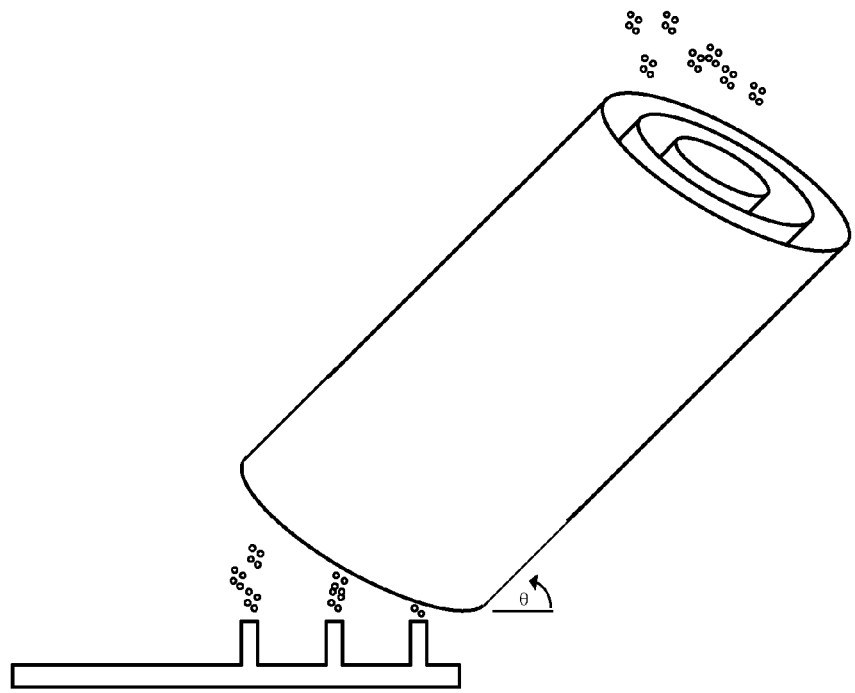
FIG. 16 illustrates an aeration system configured to use a plurality of nested inclined pipes in an embodiment.

FIG. 16 illustrates an aeration system configured to use a plurality of nested inclined pipes in an embodiment of the invention. The nested inclined pipes operate in a similar fashion as described in FIG. 15. Air can be directed into each individual nested pipe or the air output can be spread out and then pass through the pipes as the air bubbles are caught by each pipe. The inclination angle theta ($\theta$) of the pipes may vary from 0 degrees to 90 degrees.

Figure 17:
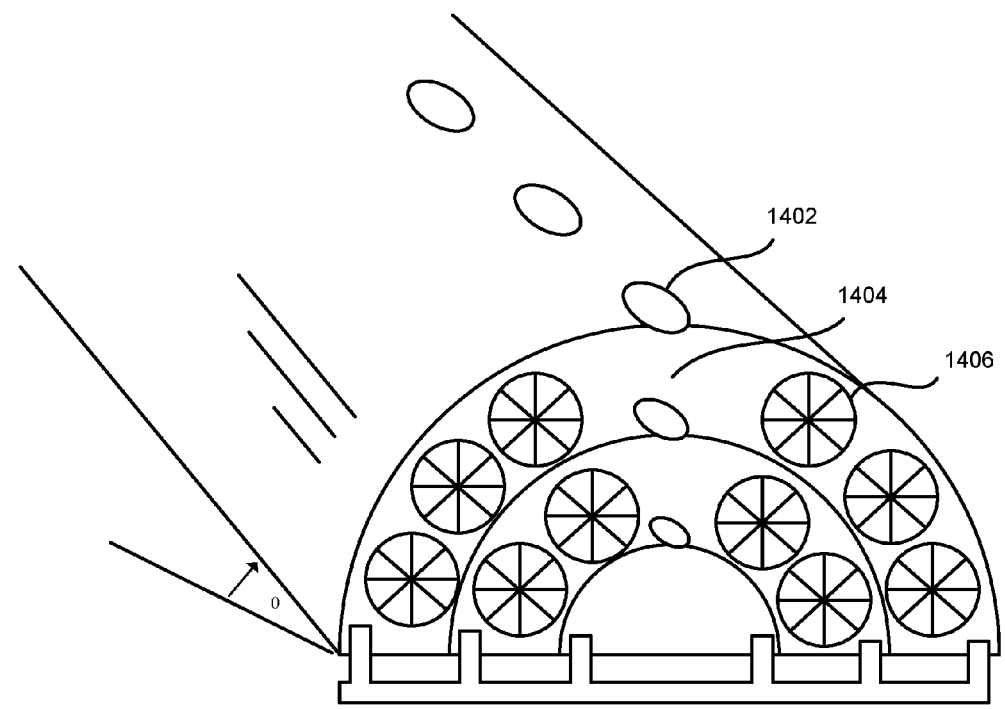
FIG. 17 illustrates an aeration system configured to use a plurality of inclined or horizontal nested pipes in an embodiment.

FIG. 17 illustrates an aeration system configured to use a plurality of inclined or horizontally nested pipes. In this embodiment, a top half of a pipe is shown but a full radius pipe may also be used. An area 1404 with a set of holes 1402 can be provided to release the bubbles from the pipes. Alternatively, one or more holes of various sizes or lengths can be cut in the location where the holes are shown in order to provide an escape for the air bubbles. As described previously, the area available for bio-film growth on submerged surfaces is increased using a material 1406 with high surface area-to-volume and/or weight ratio that is located between two or more walls of the aeration structure. The inclination angle theta ($\theta$) of the nested pipes may vary from 0 degrees to 90 degrees.

Figure 18:
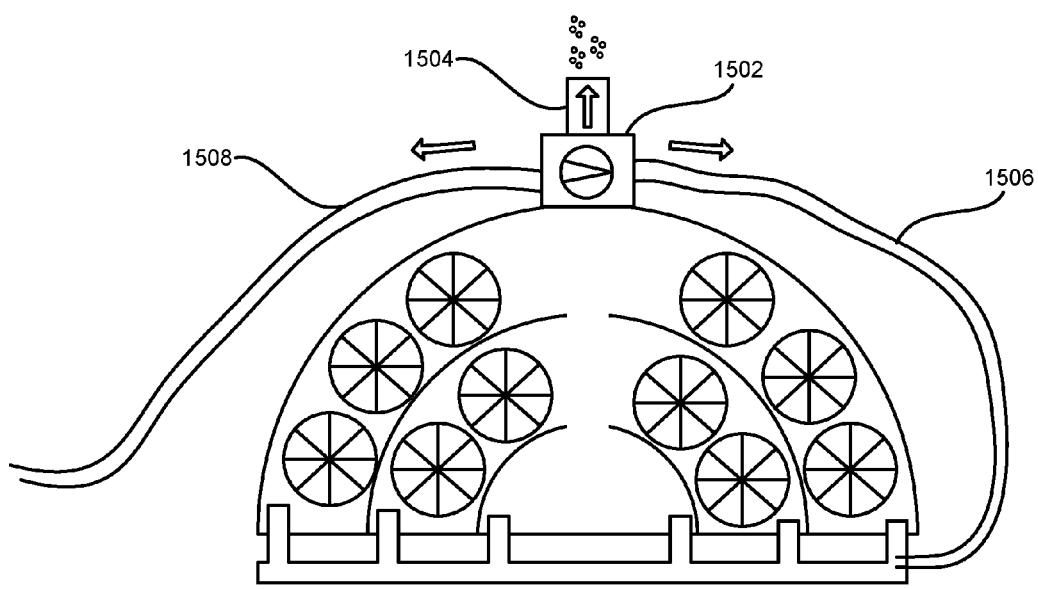
FIG. 18 illustrates a switching mechanism for routing air and water out through different conduits in an embodiment.

FIG. 18 illustrates a switching mechanism for routing air and contaminated water out of the aeration structure through different routes in an embodiment of the invention. The routing switch 1502 can provide two or more routes for the air bubbles and the contaminated water moved by the air bubbles. In a first configuration, the switch can allow the air bubbles to escape directly to the surface 1504. In a second configuration, the exiting bubbles and contaminated water can be recycled and routed back into the same aeration structure 1506. In a third configuration, exiting bubbles and contaminated water can be directed to the inlet of another submerged device, or to a separate lagoon or effluent channel. The multiple switching structure allows an operator to direct exiting contaminated water and bubbles directly to the atmosphere, to same aeration structure for additional processing, to a sister aeration unit, or to transfer treated air, contaminated water, and bacteria cells to the other structures 1508 and this may aid in controlling odor. The routing switch can be a passive switch that uses the passive air lift to move the air and contaminated water through the switch or the routing switch can contain a motor driven mechanical pump (e.g., impeller) to drive contaminated water through to another aeration structure or to recycle the contaminated water back to the same structure.

Figure 19:
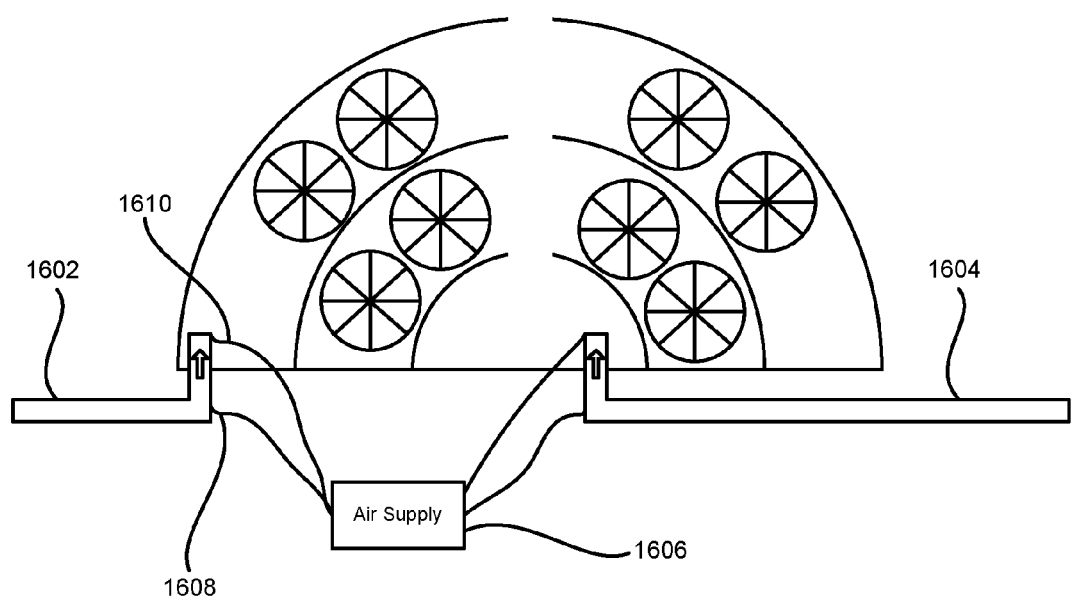
FIG. 19 is a side view cross-sectional view of bubble lifts in an embodiment.

FIG. 19 is a side cross sectional view of bubble lifts in an embodiment of the invention. An air supply 1606 is provided to supply bubbles to the spider pipes 1602, 1604. The air supply can enter the pipe at or near the elbow of the pipe 1608 or a bubble ring 1610 can be provided at the outgoing throat of the pipe. This air lift provides a type of pumping action for the spider pipes and can enable contaminated water to be pulled though the pipes. Specifically, contaminated water can be drawn from the inlet of the pipes which are located at different distances and angles from the aeration structure. Of course, air can also be introduced at the intake of the pipe, if desired.

Figure 20:
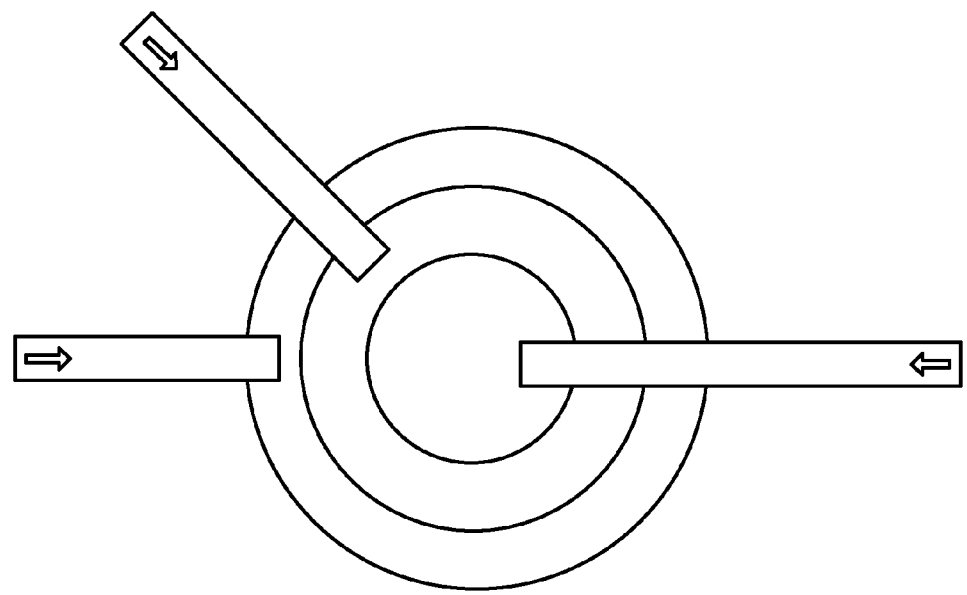
FIG. 20 is a plan view of the bubble lift of FIG. 19 in an embodiment.

The reason the pipes may be called spider pipes is illustrated in FIG. 20, which is a plan view of the bubble lift embodiment of FIG. 19. The location of the inlets to the spider pipes is set away from the aeration structure to enable additional contaminated water to be drawn into the aeration structure, and this can bring in additional nutrients and seeding bacteria into the aeration structure. These spider pipes aid in supplying contaminated water from a variety of locations to seed the aeration structure. The horizontal portion of the pipe can also be used to capture phosphorous compounds using the bacteria colonies that form in the horizontal pipe. Specifically, a carbon source and anaerobic environment in the horizontal pipe section can provide an environment where the bacteria desire to uptake the phosphorous compounds. In addition, the contaminated water lifts utilize the bubble process that is already being applied to create additional water mixing in the lagoon or channel.

The spider piping can also be used to draw in contaminated water from other places in the lagoon. For example, the spider pipe can draw contaminated water from the end of a channel or lagoon to recycle water back to the beginning of a channel or lagoon. Alternatively, the spider pipe can have an intake at the end of a channel or lagoon to allow bacteria colonies to be drawn from that area, which may enable the bacteria colonies at the beginning of the treatment process to take hold faster.

As noted above, the aeration system of the submerged modules causes contaminated water surrounding the modules to be drawn in at the lower level and expelled at the top of the modules. This feature advantageously helps to promote complete treatment of the contaminated water, rather than allowing some portions of contaminated water to short-circuit to the outlet without complete treatment. That is, as a given volume of contaminated water passes a submerged module, the bottom-to-surface currents created by the lifting motion of air bubbles associated with that module will tend to mix and circulate the volume of contaminated water so that a substantial portion of that contaminated water is ultimately drawn into the module and brought into contact with the bacteria. Those portions of the volume that are not actually treated by a given module will be mixed and dispersed so that treatment by a subsequent module is likely. Thus, as the contaminated water works its way toward the outlet, the chances are very high that the entire volume will be treated along the way. A channeled lagoon configuration in particular is designed to increase the likelihood that the contaminated water will be fully treated. In any case, the volume of untreated water becomes a small percentage of the whole volume over time.

One advantage of a lagoon system is low maintenance and operational costs. The submerged bio-film modules fit well into this operational scenario. They are essentially passive devices that, once in place, need little ongoing maintenance beyond the air supply. Because they are modular, the devices can be added to a lagoon a few at a time until the desired level of treatment is attained.

The present invention is beneficial in several ways. First, odorous ammonia concentrations are reduced and replaced with the more benign nitrate, which is ultimately converted to harmless nitrogen $N_2$. Biochemical Oxygen Demand (BOD) of the wastewater is greatly reduced. Mixing occurs in the lagoon, which reduces vertical stratification and enables more consistent pollutant removal. Short-circuiting of wastewater from the inlet to the outlet could also be reduced simply by the presence of physical barriers (the submerged modules) that naturally create water circulation by virtue of their aeration system. For animal operations, where the treated lagoon water is returned for barn flushing, the cleaner lagoon effluent would improve the air quality and reduce the demand for fresh makeup water.

The present invention can be used to treat many types of contaminated water bodies. For example, this system can be used to treat contaminated water or liquids from fish farms, aquariums, reservoirs, estuaries, oxidation ditches, feedlot settling ponds, landfills (i.e., landfill leachate), individual containers that collect wastewater (municipal and industrial), or other bodies of liquid. In addition, the system and devices might be used as part of a series of linear processes and configurations. This means the system and method may be able to improve the quality of virtually any body of contaminated water due to the large variety of potential bacteria available.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A system for removal of undesirable substances from a body of liquid, comprising:
    an aeration structure constructed of a pipe having a continuously inclined surface configured to provide an interaction of air bubbles against substantially an entire length of the continuously inclined surface while moving toward a top of the body of liquid, the continuously inclined surface being substantially submerged in the body of liquid;
    a bio-film of bacteria disposed on the continuously inclined surface;
    a high surface area-to-volume structure located within the pipe upon which a bio-film of bacteria can be formed;
    an aeration system, couplable to an air supply system, configured to release the air bubbles toward a bottom of the continuously inclined surface, such that the air bubbles move along the continuously inclined surface and the high surface-to-volume structure as the air bubbles rise so as to (i) create a variety of aerobic-anaerobic conditions for the bio-film and (ii) create a bottom-to-top circulation pattern to provide selective air mixing to support a micro climate for the bio-film on exposed surfaces.

2. A system as in claim 1, wherein a second aeration structure is formed that is nested within the aeration structure and the high surface area-to-volume structure is located between the first aeration structure and the second aeration structure.

3. A system as in claim 1, wherein the high surface area-to-volume structure is held in position within the pipe by a retainer selected from the group consisting of: netting, a wire guide, a retainer at a bottom of the aeration structure, a plurality of flanges on the bottom of the aeration structure and a grill.

4. A system as in claim 1, wherein the high surface area-to-volume structure further comprises a high surface area-to-weight packing media.

5. A system as in claim 1, wherein aerobic bacteria grow at an exposed surface of the bio-film of the high surface area-to-volume structure and anaerobic bacteria are promoted in an area close to a substrate surface of the high surface area-to-volume structure.

6. A system as in claim 1, wherein movement of the bubbles circulates at least a portion of the body of liquid near the continuously inclined surface and through the high surface area-to-volume structure.

7. A system as in claim 1, wherein a bio-film on a surface of an outer wall of the aeration structure can have an aerobic environment, the bio-film on the high surface area-to-volume structure can have a moderately aerobic environment, and a bio-film on an exterior surface of an inner wall opposing the outer wall of the aeration structure is a substantially anoxic environment.

8. A system as in claim 1, wherein the aeration structure has a rough surface to promote bio-film growth.

9. A system as in claim 1, wherein the aeration structure has a rough surface formed by sand granules to promote bio-film growth.

10. A system as in claim 1, further comprising a second aeration structure with an inlet of the second aeration structure horizontally connected to an outlet of the first aeration structure.

11. A system as in claim 1, further comprising a second aeration structure with an inlet of the second aeration structure vertically connected to an outlet of the first aeration structure.

12. A system for removal of undesirable substances from a body of liquid, comprising:
- an aeration structure constructed of a pipe having a continuously inclined surface configured to provide a continuous interaction of air bubbles against substantially an entire length of the continuously inclined surface while moving toward a top of the body of liquid, the continuously inclined surface being substantially submerged in the body of liquid;
- a bio-film of bacteria disposed on the continuously inclined surface;
- a high surface area-to-volume structure located within the pipe upon which a bio-film of bacteria can be formed;
- a heater located in proximity to the aeration structure configured to provide a warmer environment for the bio-film; and
- an aeration system, couplable to an air supply system, configured to release the air bubbles toward a bottom of the continuously inclined surface, such that the air bubbles move along the continuously inclined surface as they rise so as to (i) create a variety of aerobic conditions at the bio-film and (ii) engage the air bubbles in a continuous mixing of a micro climate for the bio-film in response to an orientation of the continuously inclined surface (iii) circulate water bottom to top using air bubble lift.

13. A system as in claim 12, wherein the heater is a water heater located at a bottom of the aeration structure, the water heater being configured to heat water that will travel up through the aeration structure and promote bio-film growth.

14. A system as in claim 12, wherein the heater is located on an interior wall surface of the aeration structure.

15. A system as in claim 12, wherein the heater is a resistive electrical heater located on an interior wall surface of the aeration structure and configured to heat the aeration structure and a portion of the liquid.

16. A system as in claim 12, wherein the heater is a resistive electrical heater that is embedded within the aeration structure and configured to heat the aeration structure.

17. A system as in claim 12, further comprising an air source heater included in the air supply system to provide heated air bubbles that promote bio-film growth.

18. A system as in claim 12, further comprising an air source heater included in the air supply system to provide heated air bubbles that pass through a passage within the aeration structure to promote bio-film growth.

19. A system as in claim 12, further comprising a solar collection structure that is attached in proximity to the aeration structure to provide power for aeration or heat.

20. A system as in claim 12, wherein the air supply system comprises a windmill that provides power to the air supply system to inject compressed air at the bottom of the continuously inclined surface.

21. A system for removal of undesirable substances from a body of liquid, comprising:
- a plurality of aeration structures constructed of a pipe having a continuously inclined surface configured to provide an interaction of air bubbles against a length of the continuously inclined surface while moving toward a top of the body of liquid, the continuously inclined surface being substantially submerged in the body of liquid, wherein substantially the entire continuously inclined surface is at an incline;
- a bio-film of bacteria colonies disposed on the continuously inclined surface used to breakdown organic material;
- a high surface area-to-volume structure located within the pipe upon which a bio-film of bacteria can be formed;
- a circuit channel formed in the body of liquid within which the plurality of aeration structures are located; and
- an aeration system, couplable to an air supply system, configured to release the air bubbles on demand toward a bottom side of the continuously inclined surface, such that the air bubbles move along the continuously inclined surface and the high surface-to-volume structure as they rise so as to (i) create a variety of aerobic-anaerobic conditions for the bio-film and (ii) create a bottom-to-top circulation pattern to provide nutrient and air mixing to support a micro climate for the bio-film on exposed surfaces.

22. A system as in claim 21, further comprising a first portion of the circuit channel having an aeration system and a second portion of the circuit channel having no aeration system.

23. A system as in claim 22, wherein the portion of the circuit channel having an aeration system further comprises a zone where aerobic bacteria colonize the bio-film to nitrify ammonia nitrogen.

24. A system as in claim 22, wherein the portion of the circuit channel without an aeration system further comprises a zone where anoxic bacteria colonize the bio-film to denitrify nitrites and nitrates from the liquid.

25. A system as in claim 21, wherein the aeration system is configured to provide aeration for a first timed period and then the aeration system is turned off for a second timed period.

26. A system as in claim 25, wherein turning on the aeration system enables the bio-film to aerobically uptake phosphorous compounds from liquid processed during the aerobic period that are discharged via a primary discharge conduit.

27. A system as in claim 26, wherein the aeration system in the body of liquid is turned off for a pre-set time period to allow the phosphorous compounds disgorged from the bio-film to be diverted via a secondary discharge conduit and to be held in a separate retaining body of liquid.

28. A system as in claim 21, further comprising a first portion of the circuit channel being highly aerated, a second portion of the circuit channel having moderate aeration and a third portion of the circuit channel being non-aerated.

29. A method for removing undesirable substances from a body of liquid, comprising:
- directing a portion of the body of liquid to flow through a circuit channel formed using at least one guidance wall in the body of liquid;
- submerging a plurality of aeration structures constructed of a pipe in the circuit channel, the pipe having a continuously inclined surface in the body of liquid and substantially the entire continuously inclined surface of each aeration structure is at an incline;
- enabling a variety of bio-film bacterial colonies to be disposed on the continuously inclined surfaces and high surface-to-volume structure surfaces located within the pipe;
- releasing air at a defined point on the continuously inclined surface using an aeration system, couplable to an air supply system, such that air bubbles are formed and move along the continuously inclined surface as they rise so as to (i) create a variety of aerobic and anaerobic conditions for the bio-film and (ii) create a bottom-totop circulation pattern to provide nutrient and air mixing to support a micro climate for the bio-film on exposed surfaces.

30. A method as in claim 29, further comprising placing an aeration system in a first portion of the circuit channel and providing a second portion of the circuit channel having no aeration system.

31. A method as in claim 30, wherein a defined point on the continuously inclined surface further comprises the bottom of the continuously inclined surface, a middle point of the continuously included surface, or a top point of the continuously included surface.

32. A method as in claim 29, further comprising activating the aeration system to provide aeration for a timed period and deactivating the aeration for a timed period.

33. A method as in claim 29, further comprising:
- activating the aeration system to enable aerobic bio-film to capture phosphorous compounds from waste liquid and discharging fluid when aeration is active; and
- disabling the aeration system so as to disgorge phosphorous compounds from the bio-film while diverting fluid from the body of liquid to be held in a separate retaining pond.

* * * * *